June 1, 1954
S. NATELSON
2,680,060
ULTRAMICROGASOMETER FOR DETERMINING GASES IN BODY FLUIDS
Filed Aug. 21, 1951
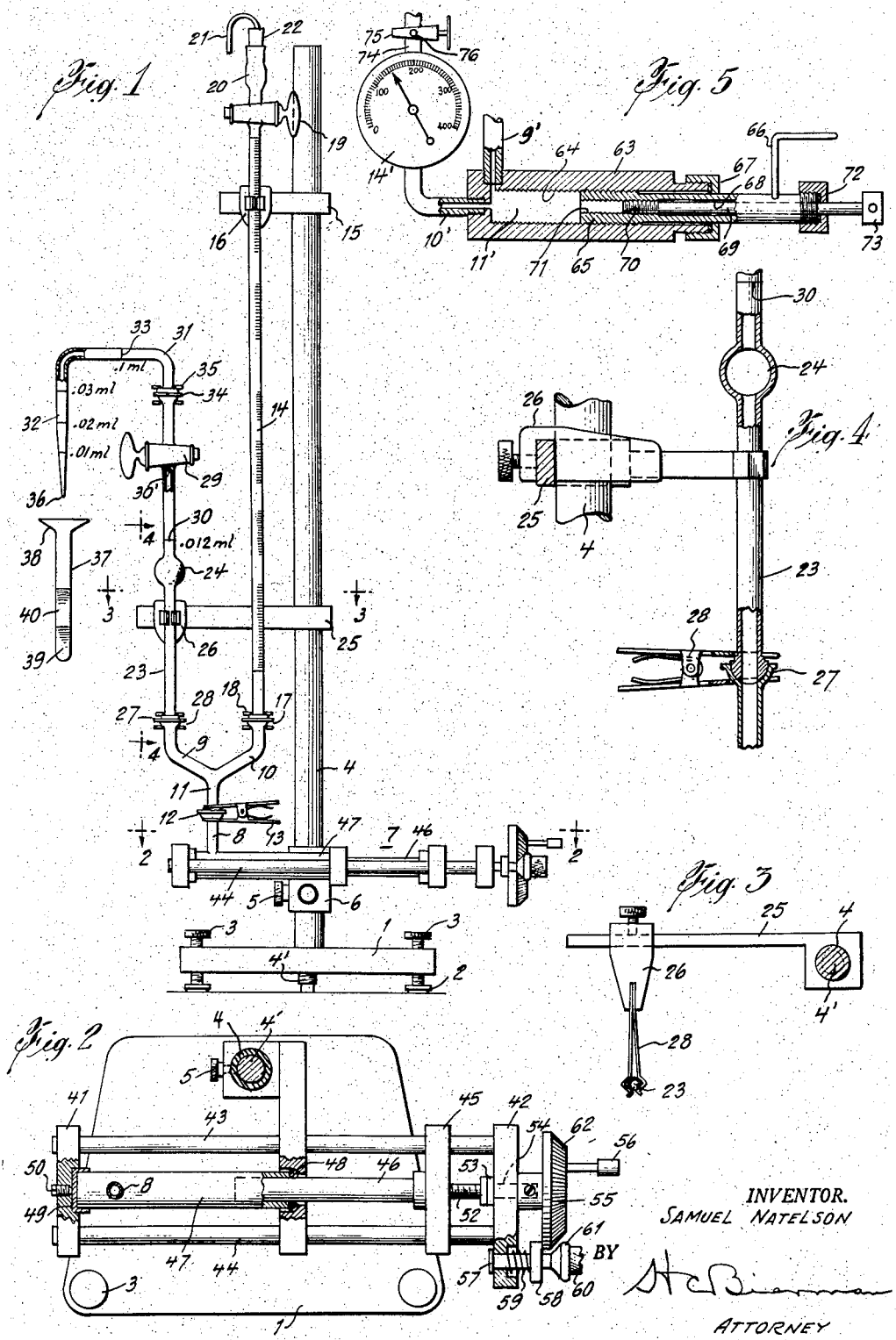
INVENTOR.
SAMUEL NATELSON
BY
ATTORNEY

Patented June 1, 1954

2,680,060

UNITED STATES PATENT OFFICE 2,680,060

ULTRAMICROGASOMETER FOR DETERMINING GASES IN BODY FLUIDS

Samuel Natelson, Rockford, Ill., assignor to Kopp Scientific, Inc., New York, N. Y., a corporation of New York Application August 21, 1951, Serial No. 242,869

8 Claims. (Cl. 23—253)

This invention relates to a novel instrument for the measurement of minute volumes of gas liberated from a liquid medium in which the gas or gases were originally dissolved or chemically bound.

In analyses where only minute samples are available such as the analysis of blood from the heel or fingertip of premature infants it is often essential for the diagnosis and treatment of pathological conditions to determine the carbon dioxide, oxygen, carbon monoxide and nitrogen content of the blood, plasma or serum. In the concentration in which these substances are found in samples of blood, plasma or serum the solubility of the gases in the medium is such that when treated for the liberation of the gas, such as adding acid to liberate $CO_2$ or ferric salts to liberate oxygen, most of the gas so liberated remains dissolved in the liquid phase. If the pressure is reduced so as to liberate the gas and then the pressure is brought back to atmospheric pressure the gas will redissolve resulting in lowered volumes of gas being measured. This is a serious error when minute volumes of gas are measured.

In view of the above, it is among the objects of the present invention to provide an apparatus and a method whereby extremely small quantities of liquid may be analyzed for gas content.

It is also among the objects of the present invention to provide a relatively simple equipment which may be operated by ordinarily skilled individuals to give quick and accurate results.

It is further among the objects of the present invention to provide an apparatus and a method which may be utilized for the gas analysis of various substances for the determination of minute quantities of gas contained therein.

In practicing the present invention, there is provided a reaction chamber generally in the form of a tube held vertically and having an enlargement therein with a stopcock for cutting off the flow of liquid. There is also provided a capillary pipet calibrated to accurately register small volumes and integral with a tube portion of larger diameter and connected to the reaction chamber. There is also provided a pressure gauge usually in the form of a calibrated manometer which is in communication with the reaction chamber and also in communication with a source of an inert liquid with means for advancing and retreating said inert liquid through the reaction chamber and the pipet. Usually the liquid is mercury, although other liquids inert to the reactants including the liquid to be analyzed may be used. The aforesaid means usually includes a screw threaded arrangement whereby a plunger operating in a tube moves the inert liquid and a vernier may be associated with said means to give close and accurate control.

In the instrument described, measurement of volume is done at markedly reduced pressures under which condition the gases are substantially insoluble in the liquid medium thus eliminating this source of error. An important integral part of the instrument is the measuring device, called herein the pipet, which is used to measure out the sample and reagents to be added, with precision, and to introduce the sample and reagents into the reaction vessel. Thus no additional measuring device is necessary to measure the sample into the instrument. This pipet is interchangeable with other pipets of different capacity so that the instrument is flexible in the amount and type of analysis to be performed.

In order to introduce the sample into the pipet a precision type of measuring screw preferably with vernier is an integral part of the instrument. This screw may act as a plunger to reduce the pressure when the screw is retreated or increase the pressure when the screw is advanced. Thus if too much or too little of the sample were taken fine adjustment by means of the vernier screw will bring the sample precisely to the desired mark. This has the advantage over the conventional type of pipet in that easy and accurate control is maintained over the position of the sample to be measured. In one variation of this instrument the screw is coupled to a plunger made of glass or metal in which case the screw serves to advance or withdraw the plunger which in turn activates the movement of the sample to be measured. Mercury or certain organic liquids such as the silicones inert to the chemical action of the sample to be analyzed and in which the sample is insoluble and which have a low vapor pressure are used to act as a continuum between the screw or plunger, the means to measure pressure and the fluid to be analyzed. Thus no air or other gases are admitted to the instrument except those contained in the sample to be analyzed and the reagents used.

In the operation of the device, the gas is first liberated by reducing the pressure, usually after a substance has been added to free the gas from chemical combination and/or by a substance which will reduce the solubility of the gas in the liquid medium. After the gas has been so liberated its volume is adjusted to a previously chosen constant volume (V) which is larger than the volume of the liberated gas at atmospheric pressure. This volume is usually 2 to 30 times the volume of the liberated gas at atmospheric pressure. Means is provided for measuring the pressure ($P_1$) of the gas at this constant volume. The gas is then absorbed by adding a substance in which the gas is completely soluble or the gas may be ejected. The pressure is again adjusted so that the same volume (V) is reached by the residual undissolved gas and/or by the vapor of the liquid. The pressure is again measured ($P_2$). The difference between the two pressures read is the partial pressure of the gas measured at the temperature at which the measurement is taken. The following formula is used:

$$V_a = (P_1 - P_2 + C) V / P_a \cdot T_0 / T \cdot K$$

wherein $P_1 - P_2$ is the partial pressure of the gas measured, V is the constant volume at which $P_1$ and $P_2$ are measured, C is a correction factor for the solubility of the gas in the liquid medium at the reduced pressure, determined experimentally, $P_a$ is standard atmospheric pressure (760 mm. Hg), $V_a$ the sought volume at 0° C. and 760 mm. Hg, T the absolute temperature at which the determination is carried out, $T_0$ the standard absolute temperature equivalent to 0° C. (273° K.), and K is the correction factor due to change in density of mercury from 0° C. to temperature at which the measurement is carried out. This correction is not necessary if the pressure is measured by a calibrated gauge of the diaphragm type.

The means to measure pressure may be a column of liquid contained in a transparent tube which is engine divided in millimeters so that the pressure may be measured by the height of the column, the pressure then being $hdg$, where $h$ is the height of the liquid, $d$ the density of the liquid and $g$ the gravitational pull. In another variation of this instrument the pressure tube is replaced by a sensitive gauge supplied with a dial which is calibrated directly in mm. Hg of mercury or in other suitable units such as dynes per sq. cm. The liquid serving as the continuum now rests against a flexible diaphragm. The change in pressure on the diaphragm is observed on the dial as the movement of a suitable indicator which is mechanically attached to the diaphragm. The movement of the diaphragm may be measured with greater precision by using the diaphragm as one plate of a condenser the changes in pressure resulting in chanegs in capacity of the condenser. This change in capacity is then amplified by incorporating the condenser in an amplifying circuit and reading the change in pressure on a galvanometer.

The gas is liberated in the reaction chamber which comprises a calibrated tube attached to the stopcock. This stopcock may be a two way stopcock. A turn of the stopcock leading to the pipet and a 180° turn leading to a small container. When this variation is used, the extra chamber is filled with the liquid, such as mercury, to be used for the continuum. Thus if replenishment of the liquid is needed it may be added from this container rather than through the pipet. This has the advantage that mercury may be added if needed without disturbing the contents of the pipet. The calibrated tube is calibrated to a volume (V) designed to contain a volume of from 2 to 30 times the volume of the gas to be measured. This tube is sealed to a larger chamber which is of the order of 10 to 50 times greater in volume than the calibrated volume at which the gas is to be measured. The sample and reagents are admitted to the reaction chamber. The reaction chamber is then sealed by turning the stopcock. The pressure is then reduced by retreating with the screw until the liquid is brought to the lower level of the larger chamber. At this point shaking will assist in mixing the reagents and in preventing the liberated bubbles of gas from adhering to the walls. A shaking mechanism is, therefore, included in the instrument. The screw is then advanced to bring the upper meniscus of the liquid to the volume mark (V) at which the pressure ($P_1$) is read on the manometer. If a reagent is then admitted to absorb the gas the pressure at the volume (V) will be ($P_2$) described above.

The reaction chamber is attached by ground glass connections to the pipet. The ground glass connection is preferably a flexible one of the ball joint type to allow the pipet freedom of movement when sampling. The reaction chamber is connected to the screw and manometer by pressure resistant joints.

In the accompanying drawing constituting a part hereof, and in which like reference characters indicate like parts, Fig. 1 is a front elevational view of an apparatus made in accordance with the present invention and adapted to carry out the method involved therein;

Fig. 2 is a horizontal cross-sectional view of the lower part of the apparatus taken along line 2—2 of Fig. 1;

Fig. 3 is a horizontal cross-sectional view taken along line 3—3 of Fig. 1;

Fig. 4 is an enlarged fragmentary side elevational view of the reaction chamber shown in Fig. 1, some parts being broken away and some parts being shown in section for clearness, and Fig. 5 is a fragmentary, longitudinal cross-sectional view of a modified form of the invention.

With reference to the drawings, there is provided a base 1 having a plurality of feet 2 with screws 3 for adjusting the height of the feet in order to level the apparatus. Extending upwardly from base 1 is column 4 near the bottom of which is clamped by set screw 5 a support 6 for the device 7 which moves the inert liquid through the equipment.

Extending upwardly from device 7 is a tubular extension 8. A Y-shaped tube has branches 9, 10 and 11, the latter branch being connected by ground joint 12 to tube 8. Clamp 13 insures against accidental displacement of the joint.

A calibrated tube 14 which is a manometer is secured to arm 15 on column 2 by a clamp 16 near the upper end thereof. A ground joint 17 at the lower end fits into branch 10 and is held in place by clamp 18. A stopcock 19 at the upper end of manometer 14 communicates with receptacle 20 and a bent tube 21 extending from stopper 22 constitutes a mercury seal.

The reaction chamber includes a vertical tube 23 having an enlargement 24 in the form of a bulb and is secured to arm 25 mounted on column 4 by clamp 26. The lower end 27 is a ground joint which is held on branch 9 by clamp 28. A stopcock 29 is located near the upper end of tube 23. A calibration mark 30 gives a measured volume from stopcock 29 and in the case of a specific example where the equipment is to be used for analysis of blood serum, the volume may be 0.12 ml.

The pipet consists of a bent tube 31 of relatively large diameter having a capillary end 32 calibrated at .01, .02 and .03 ml. with a calibration mark 33 measuring in this case .1 ml. A ground joint 34 connects the inner end of tube 31 to reaction chamber 23 and is held in place by clamp 35. The outer end 36 of pipet 32 is drawn to a fine or minute opening.

In conjunction with this apparatus, there may be provided containers for liquids to be analyzed or liquids which are to react with the same, all of these substances being termed "reactants." It may consist of a test tube 37 having a flared opening 38 and containing in the bottom thereof an inert liquid 39 such as mercury. The reactant 40 which is to be drawn into the system is introduced above the mercury level. In some cases the reactant 40 may be of greater specific gravity than the inert liquid used, in which case the positions of liquids 39 and 40 would be reversed.

The device 7 contains a pair of blocks 41 and 42 having secured between them tie rods 43 and 44. Slide 45 is adapted to operate on said rods and has a plunger 46 secured thereto, the free end operating within tube 47. A gasket 48 seals one end of tube 47 and a retainer 49 held by set screw 50 seals the opposite end thereof. A screw 52 has one end secured at 53 to rod 54 attached by a set screw to hand wheel 55. The other end thereof is threaded into slide 45. A handle 56 is provided for ready rotation of wheel 55. A vernier consists of rod 57 having collar 58 and urged to the right by coil spring 59. On the end thereof is operating knob 60 having a soft rubber ring 61 thereon. By depressing knob 60, ring 61 contacts with corrugations 62 on wheel 55 so that rotation of knob 60 will give a reduced rate of motion of plunger 46.

The operation of the equipment may be as follows: Reaction chamber 23, manometer 14 and device 7 may be filled with mercury or the like in any usual manner. The reactant in test tube 37 is placed over pipet 32, wheel 55 is manipulated to advance the mercury or the like through the reaction chamber into the manometer and out of the pipet until a drop of mercury forms at tip 36. Then wheel 55 is manipulated to retreat the mercury until a measured amount of liquid 40 is introduced into pipet 32. Then tip 36 is inserted in liquid 39 and wheel 55 manipulated to retreat plunger 46 and the mercury until the measured reactant is drawn into chamber 23. If more or a different reactant is desired, then after some of the mercury 39 is introduced into pipet 32, the test tube is removed and another test tube carrying another reactant is placed over tip 36, wheel 55 manipulated to retreat plunger 46 and the mercury further, and another measured amount of reactant is drawn into pipet 32. Then all of the reactants are drawn into chamber 23 past stopcock 29, which is then closed. The analysis may then proceed.

The operation of the apparatus may be well described in connection with the analysis of a blood serum for the determination of gases, specifically carbon dioxide.

The blood sample is introduced into test tube 37 containing mineral oil. It is allowed to clot and is then centrifuged. In another test tube lactic acid 40 is placed together with caprylic alcohol, which floats on and provides a seal for the lactic acid, and has the additional function of preventing foaming in the reaction chamber. A third test tube contains water with a layer of mercury at the bottom thereof. A fourth test tube contains an aqueous normal solution of NaOH with a layer of mercury at the bottom.

Plunger 46 is advanced until a drop of mercury appears at tip 36 of pipet 32. The tip 36 is immersed in the serum, plunger 46 is retreated to draw up 0.03 ml. of the serum (0.01 ml. may also be used) into pipet 32, tip 36 is raised until it is in the mineral oil. 0.01 ml. of mineral oil is drawn up. The tip is now immersed in a tube containing mercury. Most of the oil is expelled by advancing plunger 46. 0.01 ml. of mercury is now drawn up. The tip is now dipped into the lactic acid. Plunger 46 is advanced slightly to expel a globule of mercury. 0.03 ml. of lactic acid is drawn up by retreating with plunger 46. The tip of the pipet is now raised so that it is in the caprylic alcohol and 0.01 ml. of caprylic alcohol is drawn up. In a similar manner 0.1 ml. of water is drawn up followed by sufficient mercury to bring all the water beyond the stopcock. The stopcock is now closed and plunger 46 is retreated to create a vacuum bringing all the reactants into the 3 ml. reaction chamber and almost to the 3 ml. mark. Set screw 5 is loosened and the reaction chamber oscillated to mix the reactants.

The plunger is advanced until the pressure causes mercury to rise to mark 30, confining the gas between 30 and taper 30' which forms a cut-off for the gas and increasing the accuracy of measurement. The pressure is read on manometer 14. Then the mercury is advanced to increase the pressure, stopcock 29 is opened and the mercury further advanced until a drop appears at 36. The tip is dipped into the NaOH and .1 ml. drawn into the pipet, followed by sufficient mercury to bring the NaOH into chamber 23. Stopcock 29 is closed and mercury retreated to again form a vacuum and to the 3 ml. mark on the manometer. The reaction of NaOH with the $CO_2$ causes a decrease of the amount of gas present. The pressure is increased until the residual gas reaches mark 30 and the pressure is read. The difference in the pressure readings gives the partial pressure of the $CO_2$, from which the amount in the serum may be calculated.

Analysis for CO, O, or N may be done on blood by procedures similar to that for $CO_2$ where the partial pressure of the gas sought is measured before and after the absorption of the particular gas studied or by removing all other gases and measuring the partial pressure of the residual gas. This latter method is used for nitrogen. Carbon monoxide is dissolved in cuprous chloride reagent while oxygen is dissolved in sodium hydrosulphite reagent. Nitrogen is calculated by difference.

In order to minimize possible errors in the readings the distance between mark 30 and stopcock 29 is at least four times the distance from mark 30 to the top of bulb 24, and it is usually from six to ten times said distance. The construction of the pipet with a capillary calibrated end and a larger diameter portion 30 which is also calibrated, further assures accuracy in manipulation.

Referring to Fig. 5, tube 9' leads to chamber 23, tube 10' leads to pressure gauge 14' and chamber 11' is the equivalent of leg 11. Tubes 9', 10' and chamber 11' constitute a Y-connection similar to tubes 9, 10 and 11. Said chamber is formed in block 63, and is threaded at 64 and threaded tube 65 cooperates therewith, being provided with handle 66 for moving the liquid in chamber 11' by rotation of tube 65. A set-screw or other clamping means (not shown) is used to lock tube 65 in position when the vernier is operated. A packing gland 67 forms a liquid-tight seal. Within tube 65 is rod 69 threaded at 70 and cooperating with threads 71 on the inside of tube 65. A packing gland 72 provides a seal and knob 73 is used to manipulate rod 69 for fine adjustment of the liquid pressure in the system. Outlet pipe 74 from gauge 14' has stopcock 75, which may be provided with a side opening 76 to release excess liquid, such as mercury.

The Y-shaped tube is, in effect, a three-way tubular member having three legs to which the various operating elements are connected so that the inert liquid may flow through said member during the analysis.

Although the invention has been described setting forth several specific embodiments thereof, such illustrations were for the purpose of defining the invention without limiting it. Various changes in the details may be made within the principles herein set forth, as for example, the mechanism for moving the inert liquid may be in a horizontal position, as shown in the drawing, or may be vertical or inclined so as to minimize the possibility of trapping air therein. Various other elements may be added to the combination, as for instance, a thermometer may be attached to standard 4 in order that the operations may be conducted at known temperatures. A handle may be secured to the head of set screw 5 or may be formed thereon to facilitate the shaking of the reaction chamber to mix the reactants or a mechanically operated shaking mechanism may be made part of the apparatus. The pressure gauge may be of any suitable type adapted for the present purposes.

Pipet 31 and 32 may be replaced by pipets of different sizes in order to accommodate different volumes of reactants which may be required in various operations. Also, the pipet may be replaced by other devices which may be used for the liberation of gases from substances to be analyzed. For instance, such devices may be used for the determination of nitrogen in amino acids or urea in urine or blood. Such a device may be used for the analysis of bone wherein gases are liberated and measured as well as the determination of the efficiency of yeast by analysis of production of carbon dioxide. These and other changes may be made within the spirit of the invention, which is to be broadly construed and not to be limited except by the character of the claims appended hereto.

I claim:

1. Apparatus for determining minute quantities of gases in minute quantities of body fluids consisting essentially of a base, a barrel mounted on said base, a plunger in said barrel and means for advancing and retracting said plunger, a tube extending upwardly from said barrel, a three-way tubular member having three legs which intercommunicate, one leg being joined to the tube of said barrel, the second leg having a pressure gage attached thereto, a substantially vertical reaction chamber mounted on said base and having a tubular portion with an intermediate bulbar portion, the lower end of said chamber being connected to the third leg of said member, a valve attached to the upper end of said chamber, an inverted U-shaped capillary pipet, one end of which is attached to the side of said valve opposite said chamber, and calibration on the other end of said pipet, all said elements and connections being of non-flexible materials.

2. Apparatus according to claim 1 in which the free end of said pipet is tapered.

3. Apparatus according to claim 1 in which the three-way tubular member is joined to the respective elements by ground glass joints.

4. Apparatus according to claim 1 in which the plunger is attached to a slide having a threaded opening, a screw operating in said opening and means attached to said screw for rotating the same.

5. Apparatus according to claim 1 in which the plunger is attached to a slide having a threaded opening, a screw operating in said opening and means attached to said screw for rotating the same including a wheel and an operating handle on said wheel, and a vernier adapted to contact with said wheel.

6. Apparatus according to claim 1 in which the barrel and plunger are substantially horizontal.

7. Apparatus according to claim 1 in which the pressure gage is a vertical manometer tube mounted on said base.

8. Apparatus according to claim 1 in which the reaction chamber has a calibration mark between said bulbar portion and said valve.

References Cited in the file of this patent

UNITED STATES PATENTS

| Number | Name | Date |
|---|---|---|
| 1,433,075 | Gottlieb | Oct. 24, 1922 |
| 1,839,573 | Merrick | Jan. 5, 1932 |
| 2,359,128 | Leiboff | Sept. 26, 1944 |
| 2,531,953 | Smith et al. | Nov. 28, 1950 |
| 2,550,067 | Hewson | Apr. 24, 1951 |
| 2,560,317 | Wallace | July 10, 1951 |
| 2,561,273 | Hamilton | July 17, 1951 |
| 2,564,247 | Carson et al. | Aug. 14, 1951 |

FOREIGN PATENTS

| Number | Country | Date |
|---|---|---|
| 696,058 | Germany | Sept. 10, 1940 |

OTHER REFERENCES

Eimer and Amend, "85th Anniversary Catalog," pages 102, 103, 1936.

Fisher, "Modern Laboratory Appliances," pages 268, 269. Copyright 1942. Published by Fisher Scientific Co., Pittsburgh, Pa., and Eimer and Amend, 635 Greenwich St., N. Y. C.

Wadsworth, "Standard Methods," 3rd ed., pages 126 to 135, The William and Wilkins Co., Baltimore, Md., 1947.

Shepard, "Nat. Bur. Standards Journal of Research," vol. 26, pages 341 to 346 R. P. 1380, April, 1941.

Whitely, "Jour. of Biological Chem.," vol. 174, No. 3, pages 947 to 960, July, 1948.